(12) United States Patent
Kastelein et al.

(10) Patent No.: US 11,590,535 B2
(45) Date of Patent: Feb. 28, 2023

(54) ULTRASONIC TRANSDUCER

(71) Applicant: Honeywell International Inc., Morris Plains, NJ (US)

(72) Inventors: Bas Kastelein, Delft (NL); Bin Sai, The Hague (NL)

(73) Assignee: Honeywell International Inc., Charlotte, NC (US)

( * ) Notice: Subject to any disclaimer, the term of this patent is extended or adjusted under 35 U.S.C. 154(b) by 1283 days.

(21) Appl. No.: 16/019,027

(22) Filed: Jun. 26, 2018

(65) Prior Publication Data

US 2019/0118224 A1    Apr. 25, 2019

Related U.S. Application Data

(60) Provisional application No. 62/576,849, filed on Oct. 25, 2017.

(51) Int. Cl.
| | | |
|---|---|---|
| *B06B 1/06* | (2006.01) | |
| *G01F 1/667* | (2022.01) | |
| *G10K 11/00* | (2006.01) | |
| *G01F 1/66* | (2022.01) | |

(52) U.S. Cl.
CPC ............ *B06B 1/0681* (2013.01); *G01F 1/662* (2013.01); *G01F 1/667* (2013.01); *G10K 11/002* (2013.01)

(58) Field of Classification Search
CPC ....... B06B 1/0681; G01F 1/662; G01F 1/667; G10K 11/002
See application file for complete search history.

(56) References Cited

U.S. PATENT DOCUMENTS

| | | | |
|---|---|---|---|
| 4,556,814 A | 12/1985 | Ito et al. | |
| 4,800,316 A | 1/1989 | Ju-Zhen | |
| 5,078,013 A | 1/1992 | Kuramochi et al. | |
| 5,226,422 A | 7/1993 | McKeighen et al. | |
| 5,354,956 A | 10/1994 | Orban et al. | |
| 5,532,024 A * | 7/1996 | Arndt | C23C 22/68 427/386 |
| 5,562,096 A * | 10/1996 | Hossack | A61B 8/12 600/446 |
| 6,286,785 B1 * | 9/2001 | Kitchen | B64C 1/12 244/119 |
| 6,763,722 B2 | 7/2004 | Fjield et al. | |
| 9,079,221 B2 | 7/2015 | Goodman et al. | |

(Continued)

FOREIGN PATENT DOCUMENTS

| | | | |
|---|---|---|---|
| EP | 2610432 A1 | 7/2013 | |
| WO | WO-2017058968 A1 * | 4/2017 | ............. B06B 1/067 |

OTHER PUBLICATIONS

European search Report for corresponding EP Application No. 19825724.8.

*Primary Examiner* — Manuel A Rivera Vargas
*Assistant Examiner* — Yaritza H Perez Bermudez
(74) *Attorney, Agent, or Firm* — Ortiz & Lopez, PLLC; Kermit D. Lopez; Luis M. Ortiz

(57) ABSTRACT

A system, method, and apparatus for reducing ringing effects associated with a transducer comprises a transducer body, a transducer cap, a piezoelectric element formed in the cap, and a damping material formed around the piezoelectric element wherein the damping material suppresses a ringing effect associated with the transducer, while an O-ring is used together with damping material to support high pressure applications up to 230 bars.

20 Claims, 5 Drawing Sheets

(56) References Cited

U.S. PATENT DOCUMENTS

| | | | |
|---|---|---|---|
| 2003/0230144 A1 | 12/2003 | Koo et al. | |
| 2008/0242984 A1 | 10/2008 | Oakley et al. | |
| 2011/0125024 A1* | 5/2011 | Mueller | G10K 11/006 |
| | | | 600/459 |
| 2011/0259107 A1* | 10/2011 | Reiche | G10K 9/22 |
| | | | 29/595 |
| 2011/0308317 A1* | 12/2011 | Mueller | G01N 29/222 |
| | | | 73/632 |
| 2012/0260742 A1* | 10/2012 | Mueller | G01S 7/521 |
| | | | 29/25.35 |
| 2013/0133408 A1* | 5/2013 | Lang | G10K 11/002 |
| | | | 73/64.53 |
| 2013/0219707 A1 | 8/2013 | Sui et al. | |
| 2015/0292927 A1* | 10/2015 | Satou | G01F 1/66 |
| | | | 73/861.29 |
| 2016/0076923 A1* | 3/2016 | Baumoel | G01F 1/668 |
| | | | 73/1.16 |
| 2016/0093280 A1* | 3/2016 | Ueberschlag | G01F 15/18 |
| | | | 367/140 |
| 2020/0072649 A1* | 3/2020 | Papathanasiou | G01F 1/667 |
| 2020/0109977 A1* | 4/2020 | Sai | B06B 1/0644 |

\* cited by examiner

ULTRASONIC TRANSDUCER

CROSS REFERENCE TO RELATED PATENT APPLICATIONS

This patent application claims the priority and benefit under 35 U.S.C. § 119(e) of U.S. Provisional Patent Application Ser. No. 62/576,849 filed Oct. 25, 2017, entitled "IMPROVED ULTRASONIC TRANSDUCER." U.S. Provisional Patent Application Ser. No. 62/576,849 is herein incorporated by reference in its entirety.

TECHNICAL FIELD

The present embodiments are generally related to gas distribution systems. The embodiments are related to methods and systems for ultrasonic meters. The embodiments are additionally related to methods and systems for ultrasonic flow meter transducers. More specifically, the embodiments are related to methods and systems for suppressing ringing effects in ultrasonic meter transducers used in high pressure applications.

BACKGROUND

Ultrasonic flow meters (USM) have become increasingly popular for fiscal flow metering worldwide. Ultrasonic meters are desirable because they can measure a wide range of flow rates with excellent accuracy, they have less impact on pressure drops, they have no moving parts, and require significantly less maintenance.

A key hardware element in a USM is the transducer that uses piezoelectric ceramics to transmit and receive ultrasounds through an encapsulated enclosure to and from substances flowing in a pipe.

It remains a challenge to produce adequate transducer signal quality. For example, in the oil and gas industry, industrial regulations impose specific application requirements including safety requirements for hazardous and flammable zones and high pressure applications. The International Organization of Legal Metrology (OIML) has standards for measuring ranges under disturbances, which require certain signal-to-noise ratios and sensitivity when measuring low flow rate with disturbances.

Furthermore, ultrasonic signal quality generated by the transducer can be affected by the operational modes of the piezoelectric element, the surrounding enclosure, and filling materials. Without proper measures, transducers produce ultrasonic frequency clutters, which can create strong and long-lasting ringing effects. Ringing effects negatively affect sensor detectability of a target echo. Such ringing effects also undermine system sensitivity. Weak signals cannot be detected and strong unwanted signals saturate the receiver's low-noise amplifier (LNA), which is meant to amplify weak signals and enhance Rx sensitivity. Additionally, ringing effects that last a long time increase the minimum measuring range (blind zone), which is disadvantageous to short range measurements.

Accordingly, there is a need for methods and systems that improve ultrasonic transducers so that they safely suppress ringing effects, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore one aspect of the disclosed embodiments to provide ultrasonic transducers.

It is an aspect of the disclosed embodiments to provide a method and system for improved transducers associated with ultrasonic meters.

It is another aspect of the disclosed embodiments to reduce ringing effects in transducers.

It is yet another aspect of the disclosed embodiments to provide an enhanced ultrasonic transducer that suppresses ringing effects in high-pressure applications.

The aforementioned aspects and other objectives and advantages can now be achieved as described herein. In embodiments disclosed herein, a system, method, and apparatus for reducing ringing effects associated with a transducer comprises a transducer body, a transducer cap, possible matching layer, a piezoelectric element formed in the cap, and a damping material formed around the piezoelectric element wherein the damping material suppresses a ringing effect associated with the transducer.

In another embodiment a transducer comprises a transducer cap, a piezoelectric element formed in the cap, a transducer body wherein a mouth of the transducer body has a diameter of at least 50% of a diameter of the piezoelectric element comprising a disc, an O-ring formed between the transducer body and the transducer cap; a damping material comprising an adhesive silicone sealant and heat-sink compound formed around the piezoelectric element wherein the damping material suppresses a ringing effect associated with the transducer and a potting material configured in the transducer body wherein the potting material is separated from the piezoelectric element by the damping material. The adhesive silicone sealant and heat-sink compound comprises at least one of an adhesive room temperature vulcanization silicone and a heatsink silicone compound. The O-ring can be formed of a material comprising at least one of rubber, silicone, and fluorine rubber Nitrile-butadiene (NBR).

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
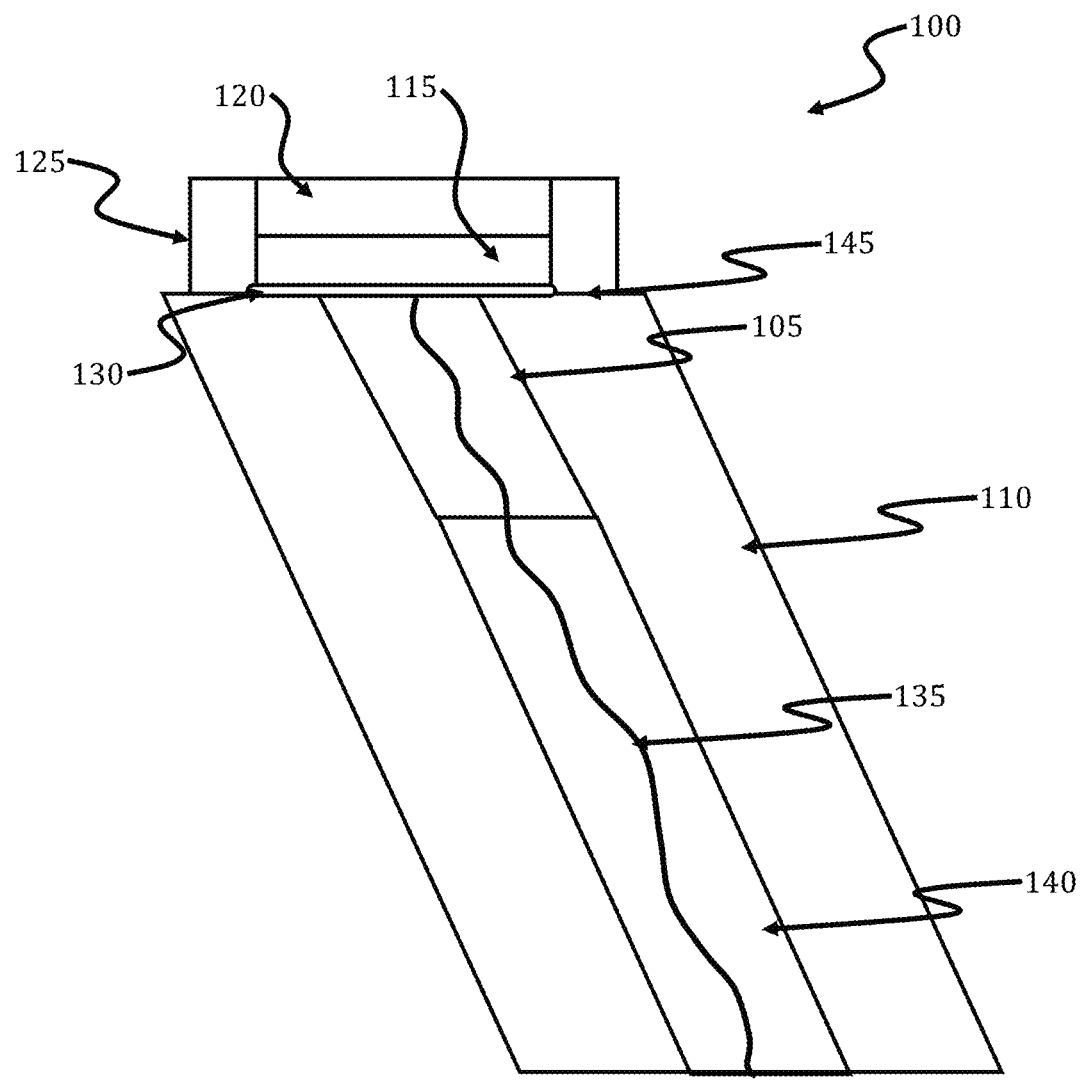
FIG. 1 depicts a transducer in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

High sensitivity ultrasonic flow meter transducers are highly desirable, particularly at low flow rates. The methods and systems disclosed herein provide a solution that reduces ringing effects in ultrasonic meter transducers as illustrated in FIG. 1.

In an embodiment, ringing effects can be suppressed by inserting a damping material 105 into the body 110 of transducer 100. The body 110 can be a metallic enclosure that is specifically configured to house a piezoelectric element 115 associated with the transducer 100. In general, the piezoelectric element 115 and a matching layer 120 are formed in a cap 125 that fits on an end of the transducer body 110. An O-ring 130 can be installed between the cap 125 and transducer body 110. The O-ring allows the piezoelectric to withstand high pressure applications (up to 230 bars).

The piezoelectric element 115 comprises a solid material (e.g., piezoelectric crystals or other such material that responds to an applied alternating electric field by producing ultrasonic waves). In the embodiments disclosed herein, the piezoelectric effect is used to detect ultrasonic sound waves that are generated by one of the paired transducers. That is, when an ultrasonic wave interfaces with piezoelectric element 115, an electrical signal is generated and transmitted for analysis via electrical leads 135.

Thus, electrical leads 135 are connected to the piezoelectric element 115 and run through the body 110 of the transducer 100. Potting material 140 can be provided in the transducer body 110. The potting material can comprise epoxy that can be hardened by a curing process during assembly of the transducer 100. It should be understood that potting material 140 can be used to meet safety provisions and seal the compartment of the transducer body 110. As such, it is preferable for the damping material 105 to be disposed nearer to and/or surrounding the piezoelectric element 115, while the potting material 140 is disposed further down the transducer body 110. In FIG. 1, the damping material 105 and potting material 140 are in contact, without any air gap or other material in between, so that high-pressure applications can be supported while still providing damping.

The damping material 105 can be specially selected to attenuate multiple reflections inside transducer body 110 from the lateral and back sides of the piezoelectric element 115. In an embodiment, the damping material 105 can comprise a special adhesive silicone sealant and heat-sink compound, including but not limited to Dow Corning 744 RTV and Dow Corning 340 heatsink silicone compound.

In order to include sufficient damping material 105 on the backside of the transducer body 110, the transducer body 110 can be formed to have a large space inside, by widening the inner bore of the transducer body 110 and the opening 145 at the top of the transducer body 110. In an exemplary embodiment, the inner bore diameter can be at least 7 mm, although other diameters may be used according to design consideration.

Figure 3A:
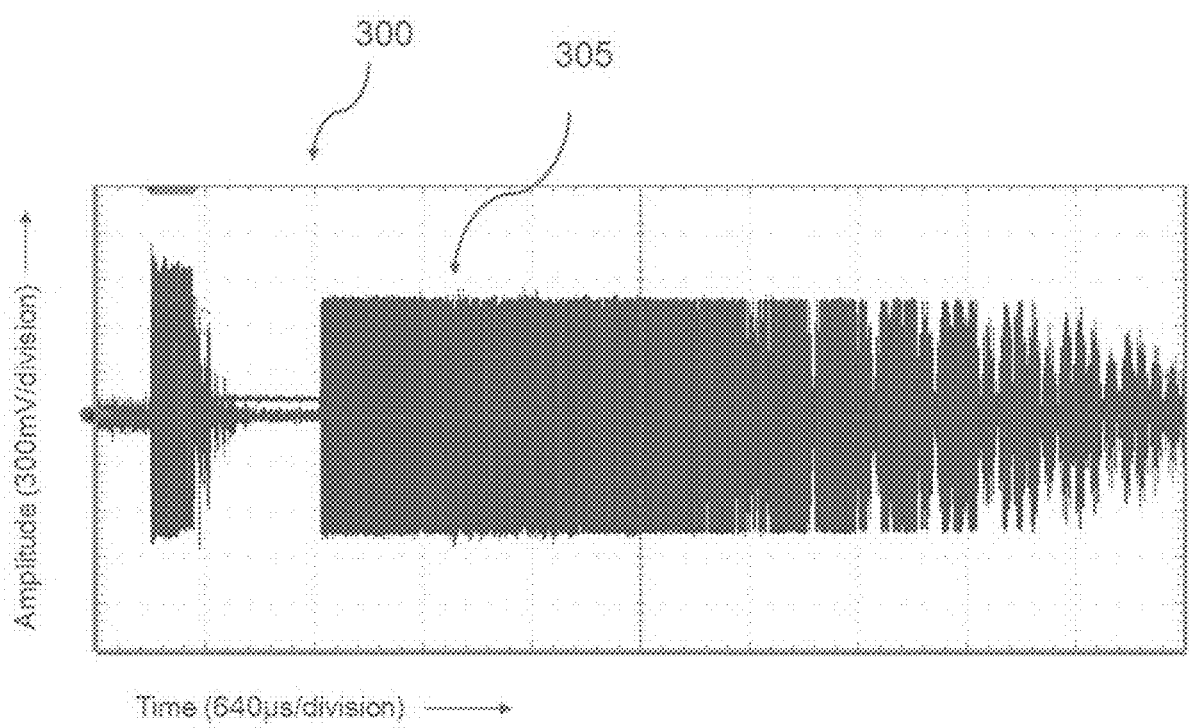
FIG. 3A depicts a chart illustrating results of an echo test in accordance with the disclosed embodiments.
Figure 3B:
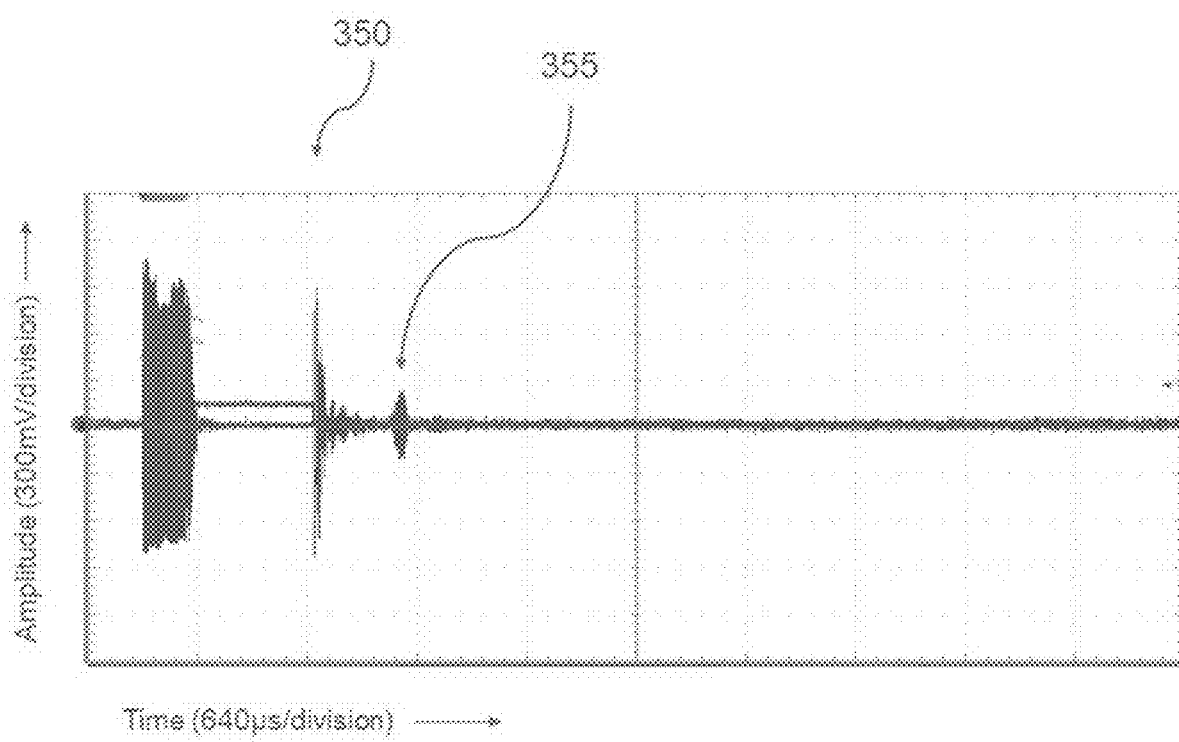
FIG. 3B depicts a chart illustrating results of an echo test in accordance with the disclosed embodiments.

The damping material 105 disposed in the transducer has been experimentally shown to improve suppression and/or elimination of ringing effects. FIGS. 3A and 3B illustrate results of echo test results with and without damping material. Chart 300 in FIG. 3A illustrates an echo test without the inclusion of damping material. Chart 300 shows significant internal ringing oscillations 305 that result in blackout of the entire useful signal and/or a poor signal quality.

FIG. 3B illustrates a chart 350 showing echo test results with damping material installed in the transducer as described in the embodiments herein. In chart 350, little or no ringing effects are detected. As a result, small target echo 355, that was not detectable when the damping material was not included, is detectable with the inclusion of damping material.

While the addition of damping material does provide a significant improvement in the suppression of ringing effects, an additional problem exists. Specifically, the transducers disclosed herein are often subject to high-pressure environments. In some embodiments, the external pressure can exceed 200 bar. The high external pressure can result in deformation of the transducer body, because the damping material is generally softer than the potting material, and therefore lends less strength to the transducer structure.

Among the regulatory requirements for transducers, those subject to high pressure must be able to "fail safe." In prior art embodiments, where potting material is used through the transducer body, the external pressure may cause the transducer body to fail, but the rigid potting material is sufficiently strong to ensure safe failure. By contrast, the softer material can cause failure of the transducer body when it is subject to high-pressure applications, without additional measures.

As such, the embodiments disclosed herein include O-ring 130, which serves to lend additional structural support to the transducer. In certain embodiments, the mouth and/or cap of the transducer can be modified to properly accept the O-ring 130 and to improve the structural integrity of the transducer. The embodiments disclosed herein, which incorporate the modified transducer/cap shape, O-ring 130, and damping material 105 thus provide suppression of ringing effects, while having sufficient structural integrity to fail safe, as required for high pressure applications. The O-ring can comprise a rubber or silicone and fluorine rubber NBR, or other such materials.

Figure 2:
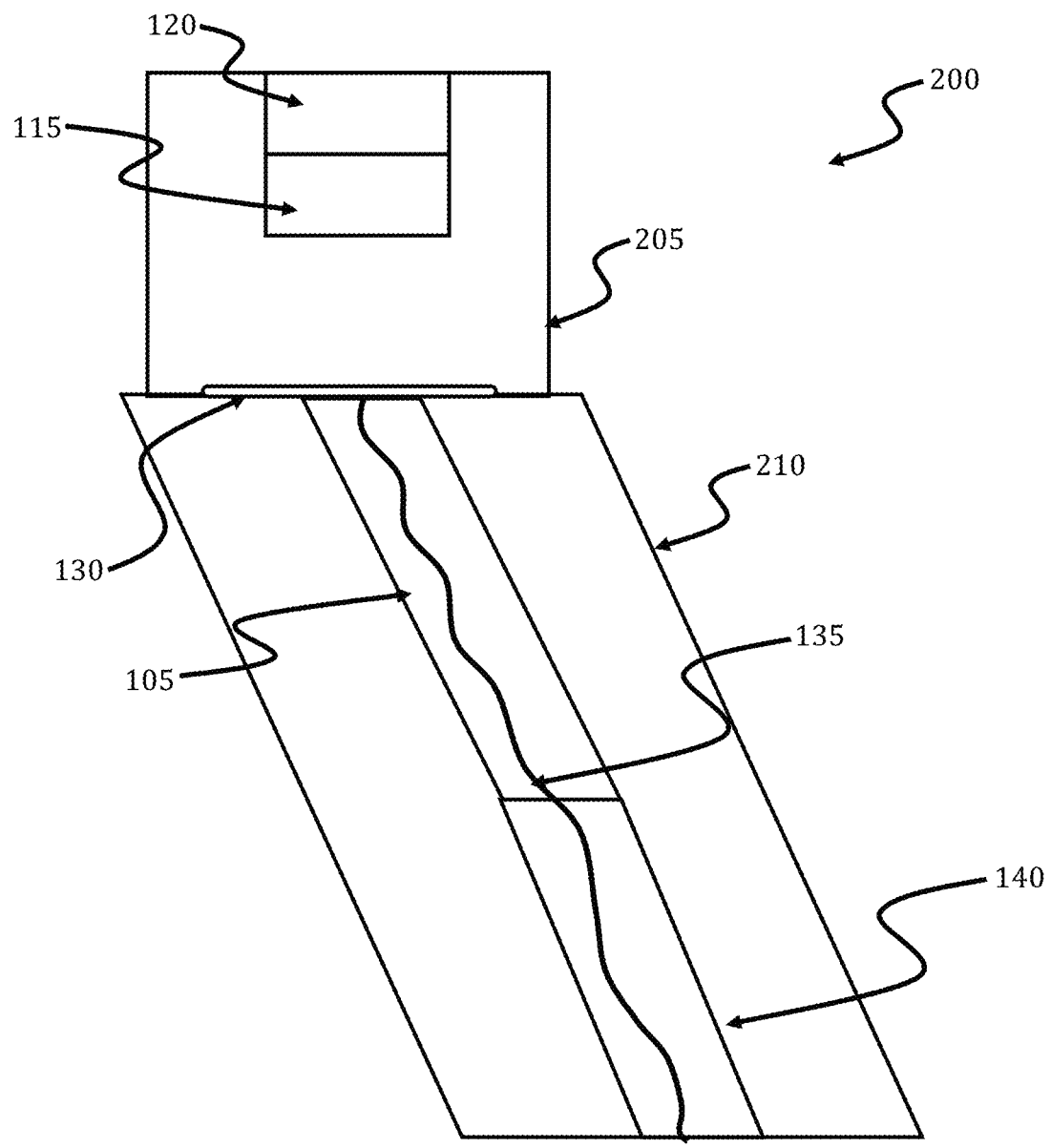
FIG. 2 depicts an alternative embodiment of a transducer in accordance with the disclosed embodiments.

FIG. 2 illustrates another embodiment of a transducer 200 configured to reduce ringing effects. The transducer 200 includes an extended cap 205 that is configured to be taller and wider than conventional transducer caps, thus providing additional space within the extended cap 205 where damping material 105 to be disposed. It should be understood that the same damping material 105 can be used in the various embodiments disclosed herein.

The top of extended cap 205 can house a piezoelectric element 115 and a matching layer 120, which can be formed toward the top of the extended cap 205. As in other embodiments, an O-ring 130 can be formed between the extended cap 205 and the transducer body 210.

In addition, electrical leads 135 are connected to the piezoelectric element 115 and run through the body 210 of the transducer 200. Potting material 140 can be provided in the transducer body 210. However, it should be understood that potting material 140 is used to meet safety provisions and seal the compartment of the transducer body 210. As such, it is preferable for the damping material 105 to be disposed nearer to and/or surrounding the piezoelectric element 115, while the potting material 140 is disposed further down the transducer body 210. In FIG. 2, the damping material 105 and potting material 140 can be in contact with one another, without any air gap or other material in between in order to provide the support necessary for high pressure applications while retaining desirable damping.

Figure 4:
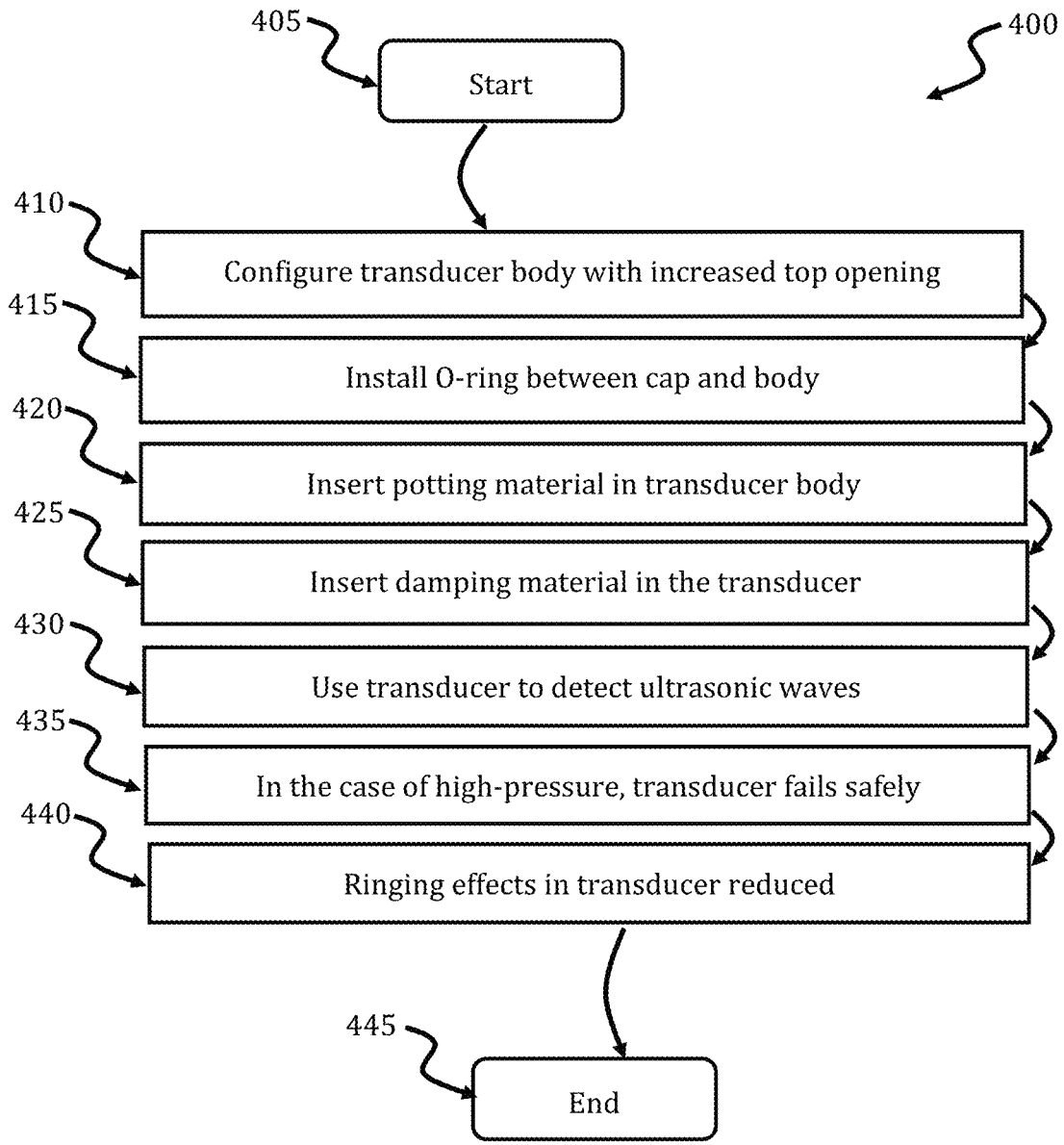
FIG. 4 depicts a flow chart illustrating steps of a method for reducing ringing effects associated with a transducer operation in accordance with the disclosed embodiments.

FIG. 4 provides a flow chart 400 of steps associated with a method for reducing ringing effects associated with an ultrasonic meter transducer. The method begins at step 405.

At step 410, a transducer body can be associated with an ultrasonic transducer. The transducer can be configured to have a larger opening at its top end, a larger diameter, and/or a larger cap. The head of the transducer is closed by forming a small compartment using a cap in which the matching layer, piezo element, and O-ring can be stacked together. The O-ring can be installed between the transducer head compartment and transducer body, as shown at step 415, to lend additional structural integrity to the transducer assembly.

Damping material can be inserted into the transducer as shown at step 420. The damping material is generally inserted into the top portion of the transducer body, and can be in contact with the back of the piezoelectric element. The damping material can comprise a special adhesive silicone sealant and heat sink compound, including but not limited to Dow Corning 744 RTV and Dow Corning 340 heatsink silicone compound.

After the damping material is inserted, potting material can be used to fill the remaining volume of the transducer body as shown at step 425. Optionally, additional damping material can be inserted in the transducer cap, around the lateral sides of the piezoelectric element and matching layer.

With the transducer assembly complete, it can be used in ultrasonic metering application as shown at step 430. In some cases, as illustrated at step 435, the application may include high-pressure environments. In such cases, the O-ring provides additional structural integrity to the transducer assembly and the transducer is thus capable of failing safely.

The damping material configured in the transducer reduces the ringing effects experienced by the transducer, as shown at step 440. Thus, the resulting use of the transducer is improved as demonstrated in the echo test illustrated FIGS. 3A and 3B. The method ends at step 445.

Based on the foregoing, it can be appreciated that a number of embodiments, preferred and alternative, are disclosed herein. In an embodiment, transducer apparatus comprises a transducer body, a transducer cap, a piezoelectric element formed in the cap, and a damping material and O-ring formed around the piezoelectric element wherein the damping material suppresses a ringing effect associated with the transducer. In an embodiment, the damping material comprises an adhesive silicone sealant and heat-sink compound.

In an embodiment the adhesive silicone sealant and heat-sink compound comprises at least one of an adhesive room temperature vulcanization silicone and a heatsink silicone compound.

In an embodiment the O-ring allows the apparatus to withstand high pressure. In an embodiment the O-ring is formed of a material comprising at least one of: rubber, silicone; and fluorine rubber Nitrile-butadiene (NBR).

In an embodiment the apparatus further comprises a potting material configured in the transducer body wherein the potting material is separated from the piezoelectric element by the damping material. In an embodiment the potting material comprises a hardened and cured epoxy.

In an embodiment a mouth of the transducer body has a diameter of at least 50% of a diameter of the piezoelectric element comprising a disc. In an embodiment the damping material is disposed in the transducer cap. In another embodiment the damping material is disposed in the transducer body.

In another embodiment a transducer system comprises a transducer body, a transducer cap, a piezoelectric element formed in the cap, an O-ring formed between the transducer body and the transducer cap, and a damping material comprising an adhesive silicone sealant and heat-sink compound formed around the piezoelectric element wherein the damping material suppresses a ringing effect associated with the transducer.

In an embodiment the adhesive silicone sealant and heat-sink compound comprises at least one of an adhesive room temperature vulcanization silicone and a heatsink silicone compound.

In an embodiment the O-ring is formed of a material comprising at least one of: rubber, silicone, and fluorine rubber Nitrile-butadiene (NBR).

In an embodiment the system further comprises a potting material configured in the transducer body wherein the potting material is separated from the piezoelectric element by the damping material. In an embodiment the potting material comprises epoxy.

In an embodiment the mouth of the transducer body has a diameter of at least 50% of a diameter of the piezoelectric element comprising a disc.

In an embodiment the damping material is disposed in at least one of the transducer cap and the transducer body.

In yet another embodiment a transducer comprises a transducer cap, a piezoelectric element formed in the cap, a transducer body wherein a mouth of the transducer body has a diameter of at least 50% of a diameter of the piezoelectric element comprising a disc, an O-ring formed between the transducer body and the transducer cap; a damping material comprising an adhesive silicone sealant and heat-sink compound formed around the piezoelectric element wherein the damping material suppresses a ringing effect associated with the transducer and a potting material configured in the transducer body wherein the potting material is separated from the piezoelectric element by the damping material.

In an embodiment the adhesive silicone sealant and heat-sink compound comprises at least one of an adhesive room temperature vulcanization silicone and a heatsink silicone compound. In an embodiment the O-ring is formed of a material comprising at least one of rubber, silicone, and fluorine rubber Nitrile-butadiene (NBR).

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A transducer apparatus, comprising:
   a transducer comprising a transducer body and a transducer cap;
   a piezoelectric element formed in said transducer cap;
   a damping material and an O-ring formed around said piezoelectric element, wherein said damping material suppresses a ringing effect associated with said transducer; and
   a potting material configured in said transducer body, wherein said potting material is separated from said piezoelectric element by said damping material.

2. The transducer apparatus of claim 1, wherein said damping material comprises an adhesive silicone sealant and heat-sink compound.

3. The transducer apparatus of claim 2, wherein said adhesive silicone sealant and heat-sink compound comprises at least one of:
   an adhesive room temperature vulcanization silicone; and
   a heatsink silicone compound.

4. The transducer apparatus of claim 1, wherein said O-ring is configured to allow said apparatus to withstand high pressure.

5. The transducer apparatus of claim 4, wherein said O-ring is formed of a material comprising at least one of:
   rubber;
   silicone; and
   fluorine rubber Nitrile-butadiene (NBR).

6. The transducer apparatus of claim 1, wherein said potting material comprises a hardened and cured epoxy.

7. The transducer apparatus of claim 1, wherein a mouth of said transducer body has a diameter of at least 50% of a diameter of said piezoelectric element comprising a disc.

8. The transducer apparatus of claim 1, wherein said damping material is disposed in said transducer cap.

9. The transducer apparatus of claim 1, wherein said damping material is disposed in said transducer body.

10. The apparatus of claim 1, wherein said damping material and said potting material are in contact with each other.

11. A transducer system, comprising:
    a transducer body;
    a transducer cap;
    a piezoelectric element formed in said cap;
    an O-ring formed between said transducer body and said transducer cap;
    a damping material comprising an adhesive silicone sealant and heat-sink compound formed around said piezoelectric element, wherein said damping material suppresses a ringing effect associated with said transducer; and
    a potting material configured in said transducer body, wherein said potting material is separated from said piezoelectric element by said damping material.

12. The transducer system of claim 11, wherein said adhesive silicone sealant and heat-sink compound comprises at least one of:
    an adhesive room temperature vulcanization silicone; and
    a heatsink silicone compound.

13. The transducer system of claim, 12 wherein said O-ring is formed of a material comprising at least one of:
    rubber;
    silicone; and
    fluorine rubber Nitrile-butadiene (NBR).

14. The transducer system of claim 11, wherein said potting material comprises epoxy.

15. The transducer system of claim 11, wherein a mouth of said transducer body has a diameter of at least 50% of a diameter of said piezoelectric element comprising a disc.

16. The transducer system of claim 11, wherein said damping material is disposed in at least one of:
    said transducer cap; and
    said transducer body.

17. The system of claim 11, wherein said damping material and said potting material are in contact with each other.

18. A transducer, comprising:
    a piezoelectric element formed in a transducer cap;
    a transducer body wherein a mouth of said transducer body has a diameter of at least 50% of a diameter of said piezoelectric element comprising a disc;
    an O-ring formed between said transducer body and said transducer cap;
    a damping material comprising an adhesive silicone sealant and heat-sink compound formed around said piezoelectric element, wherein said damping material suppresses a ringing effect associated with said transducer; and
    a potting material configured in said transducer body, wherein said potting material is separated from said piezoelectric element by said damping material.

19. The transducer of claim 18, wherein said adhesive silicone sealant and heat-sink compound comprises at least one of:
    an adhesive room temperature vulcanization silicone; and
    a heatsink silicone compound.

20. The transducer of claim 18, wherein said O-ring is formed of a material comprising at least one of:

rubber;
silicone; and
fluorine rubber Nitrile-butadiene (NBR).

* * * * *